United States Patent
Guo

(10) Patent No.: US 7,649,169 B2
(45) Date of Patent: *Jan. 19, 2010

(54) METHOD FOR DETERMINING SHALE BED BOUNDARIES AND GAMMA RAY ACTIVITY WITH GAMMA RAY INSTRUMENT

(75) Inventor: Pingjun Guo, Pearland, TX (US)

(73) Assignee: Baker Hughes Incorporated, Houston, TX (US)

( * ) Notice: Subject to any disclaimer, the term of this patent is extended or adjusted under 35 U.S.C. 154(b) by 211 days.

This patent is subject to a terminal disclaimer.

(21) Appl. No.: 11/085,902

(22) Filed: Mar. 21, 2005

(65) Prior Publication Data

US 2006/0208184 A1 Sep. 21, 2006

(51) Int. Cl.
*G01V 5/00* (2006.01)

(52) U.S. Cl. ..................................................... 250/261

(58) Field of Classification Search ................. 250/253, 250/261

See application file for complete search history.

(56) References Cited

U.S. PATENT DOCUMENTS

| | | | | |
|---|---|---|---|---|
| 2,972,251 A * | 2/1961 | Harper | | 73/152.12 |
| 3,076,094 A * | 1/1963 | Lubcke | | 250/370.01 |
| 4,071,755 A * | 1/1978 | Supernaw et al. | | 250/253 |
| 4,115,688 A | 9/1978 | Fertl et al. | | |
| 4,155,594 A | 5/1979 | Hartley et al. | | |
| 4,612,439 A * | 9/1986 | Chace | | 250/256 |
| 4,618,765 A * | 10/1986 | Sonne | | 250/269.3 |
| 4,958,073 A * | 9/1990 | Becker et al. | | 250/269.3 |
| 4,990,774 A * | 2/1991 | Smith et al. | | 250/269.5 |
| 5,334,833 A * | 8/1994 | Case et al. | | 250/269.1 |
| 5,377,105 A * | 12/1994 | Smith | | 702/8 |
| 5,483,063 A * | 1/1996 | Hall et al. | | 250/269.4 |
| 5,581,024 A * | 12/1996 | Meyer et al. | | 73/152.03 |
| 5,675,147 A * | 10/1997 | Ekstrom et al. | | 250/256 |
| 5,821,862 A | 10/1998 | MacKenzie | | |
| 6,049,282 A | 4/2000 | MacKenzie | | |
| 6,307,199 B1 * | 10/2001 | Edwards et al. | | 250/269.3 |
| 6,421,418 B1 | 7/2002 | Schulte | | |
| 6,727,505 B2 | 4/2004 | Benke et al. | | |
| 2006/0131016 A1 * | 6/2006 | Snoga | | 166/254.2 |

OTHER PUBLICATIONS

Least Squares Fitting—from Wolfram MathWorld, http://mathworld.wolfram.com/LeastSquaresFitting.html, Jun. 13, 2008, pp. 1-4.
Weisstein, Eric W., "Nonlinear Least Squares Fitting," Mathworld—A Wolfram Web Resource, Dec. 29, 2008.

* cited by examiner

*Primary Examiner*—David P Porta
*Assistant Examiner*—Carolyn Igyarto
(74) *Attorney, Agent, or Firm*—Madan & Sriram, P.C.

(57) ABSTRACT

Resolution of thin beds made by a natural gamma ray logging tool is improved using a relation between the width of the response and the bed thickness. The peak gamma ray of the bed is determined using another relation between the measured gamma ray response and the bed thickness.

19 Claims, 5 Drawing Sheets

METHOD FOR DETERMINING SHALE BED BOUNDARIES AND GAMMA RAY ACTIVITY WITH GAMMA RAY INSTRUMENT

BACKGROUND OF THE INVENTION

1. Field of the Invention

The present invention is in the field of gamma ray testing of geological formations. In particular, the invention delineates boundaries of a formation from recorded spectra.

2. Description of the Related Art

Well logging systems have been utilized in hydrocarbon exploration for many years. Such systems provide data for use by geologists and petroleum engineers in making many determinations pertinent to hydrocarbon exploration. In particular, these systems provide data for subsurface structural mapping, defining the lithology of subsurface formations, identifying hydrocarbon-productive zones, and interpreting reservoir characteristics and contents. Many types of well logging systems exist which measure different formation parameters such as conductivity, travel time of acoustic waves within the formation and the like.

One class of systems seeks to measure incidence of nuclear particles on the well logging tool from the formation for purposes well known in the art. These systems take various forms, including those measuring natural gamma rays from the formation. Still other systems measure gamma rays in the formation caused by bursts of neutrons into the formation by a neutron source carried by the tool and pulsed at a preselected interval. The natural gamma ray log is particularly useful since radioactivity in earth formations is primarily due to potassium in shales and clays, and thus serves as a lithology indicator.

In general, one such method and apparatus, when applied to the field of natural gamma ray well logging, has utilized channels of spectra including those of potassium-40, uranium and thorium. One such technique utilizes these natural gamma ray logs to determine characteristics of shale formations as described in U.S. Pat. No. 4,071,755, to Supernaw et al. Unfortunately, it can be difficult to differentiate such shale formations from other formations having relatively high concentrations of uranium, such as uranium-rich sands or formations exhibiting uranium oxide plating as a result of fluid movement.

U.S. Pat. No. 612,439 to Chace provides methods and apparatus for evaluating subsurface formations utilizing natural gamma ray spectral logging. A high-resolution, gamma ray spectrometer incorporated in a well logging instrument traverses a borehole, whereby natural gamma radiation strikes a scintillation crystal contained therein. The detected gamma rays striking the crystal cause the crystal to emit photons in the visible energy region, the intensity of which is proportional to the energy lost in the crystal by the incident gamma ray. Light energy from the crystal is optically coupled to a photomultiplier tube where the energy is convened to a proportional electrical pulse signal which is amplified and transmitted to processing circuitry.

Due to the finite size of the gamma-ray tool, the measured gamma-ray count is an indicator for the formation properties integrated only over some finite volume. In many circumstances, these integrated count values are adequate for the spatial resolution of lithology. In certain exploration areas the geologic strata of interest are less than 1 m thick and in some cases may be composed of interleaving thin beds on the order of a few centimeters thick. In the former situation the spatial averaging effects of the tool may be substantial; in the latter, bearing in mind the normal detector length of 0.15 m (0.5 ft), they may cause a distorted picture of the lithology. Deconvolution can be used to reduce the averaging effects of the tool, thereby increasing the vertical resolution and accuracy of the log. For noiseless data, this deconvolution can be done by employing a least-squares method, and the results are then accurate regardless of the spatial resolution demanded, as long as it is greater than or equal to the measurement interval. On the other hand, in the presence of noise, the accompanying degradation of deconvolved results is a sensitive function of the resolution. As the resolution interval decreases, the mathematical process of deconvolution tends to increase the noise in the results.

Sheng et al. ("Bayesian deconvolution of gamma-ray logs," Geophysics. Vol. 52, No. 11 (November 1987): p. 1535-1546.) teach a Bayesian deconvolution method that takes into account the statistics of gamma-ray log measurements, is less sensitive to noise, and shows an improvement over the conventional least-squares deconvolution methods. Jacobson et al. ("Resolution Enhancement of Nuclear Measurements Through Deconvolution, "SPWLA $31^{st}$ Annual Logging Symposium, Jun. 24-27, 1990.) have developed a modified deconvolution method that is less sensitive to noise than the conventional least-squares methods. The method used in Jacobson is based on a model in which the spatial response function of a gamma ray detector is approximated by the convolution of a rectangular box whose length is equal to the length of the detector with an exponential cusp function whose decay constant is related to the average gamma-ray attenuation length in common reservoir formations.

One problem of particular interest is simply that of identification of bed boundaries, particularly those of shale layers in a sand-shale sequence. Accurate resolution of thin beds is more important than deconvolving the entire log accurately. For such applications, a commonly used method has been to identify bed boundaries from inflection points on the log. This approach works reasonably well if the thickness of the shale bed is sufficiently large and the log reading is within 5% of the fully developed API value. The method however is inaccurate in thin beds. It would be desirable to have an improved method and apparatus for resolution of thin beds from natural gamma ray measurements. The present invention satisfies this need.

SUMMARY OF THE INVENTION

One embodiment of the present invention is a method of evaluating an earth formation including a thin bed. Measurements made with a nuclear logging tool are obtained at a plurality of depths encompassing the thin bed. The thin bed may be a shale. A characteristic width of the measurements is determined, and a thickness of the thin bed is determined using a predetermined relationship relating the characteristic width to the thickness. The measurements may include natural gamma ray measurements. A length of the sensor may be greater than the thickness of the thin bed. The predetermined relationship may include an exponential function of the characteristic width. The relationship may be obtained by Monte Carlo simulation. Using the maximum value of the measurements, a peak response characterizing the thin bed may be determined. This peak response is the true response that would be measured if the bed were sufficiently thick.

Another embodiment of the invention is an apparatus for evaluating an earth formation including a thin bed. The apparatus includes a sensor on a nuclear logging tool which makes measurements at a plurality of depths encompassing the thin bed. A processor determines a characteristic width of the measurements, and determines a thickness of the thin bed using a predetermined relationship relating the characteristic width to the thickness. The measurements may be natural gamma ray measurements. The length of the sensor may be greater than the thickness of the bed. The processor may determine the characteristic by curve fitting the measurements. The predetermined relation may include an exponential function of the characteristic width. The processor may further determine a maximum value of the measurements and determine a peak response characterizing the thin bed from the maximum value using a predetermined relationship. The logging tool may be conveyed into a borehole in the earth formation using a wireline, slickline or drilling tubular. The processor may be downhole, at a surface location or at a remote location.

Another embodiment of the invention is a computer readable medium for use with an apparatus for evaluating an earth formation including a thin bed. The apparatus includes a sensor on a nuclear logging tool which makes measurements at a plurality of depths encompassing the thin bed. The medium includes instructions which enable determination of a characteristic width of the measurements and determination of a thickness of the thin bed using a predetermined relationship relating the characteristic width to the thickness. The medium may be selected from a ROM, an EPROM, an EAROM, a Flash Memory, and an Optical disk.

BRIEF DESCRIPTION OF THE DRAWINGS

The present invention is best understood with reference to the accompanying figures in which like numerals refer to like elements and in which.

DETAILED DESCRIPTION OF THE INVENTION

Figure 1:
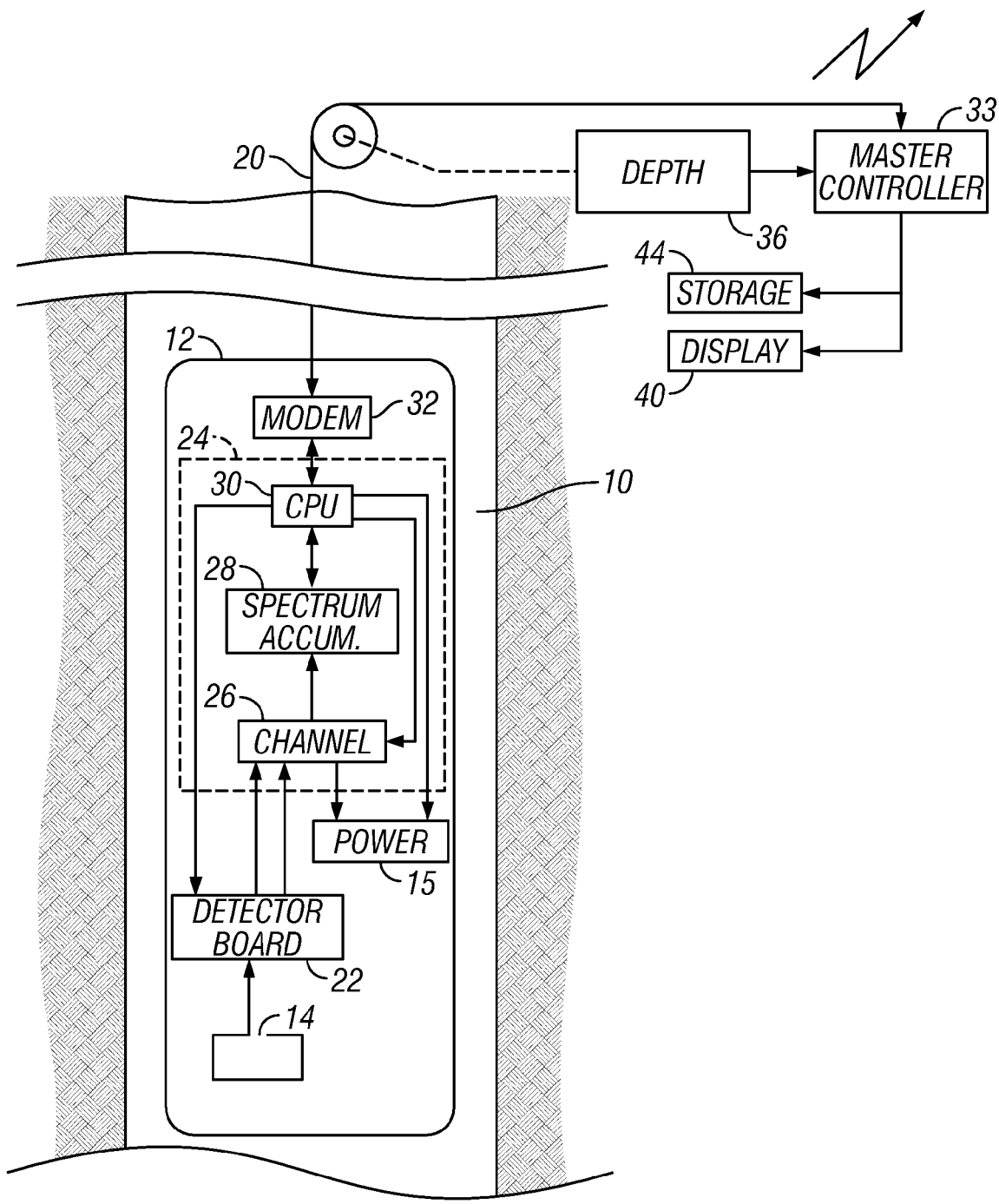
FIG. 1 (prior art) is an overall schematic diagram of the nuclear well logging system of the present invention.

The logging tool described above may be part of a system, such as that illustrated in FIG. 1. The system shown in FIG. 1 is a prior art system. Well 10 penetrates the earth's surface and may or may not be cased depending upon the particular well being investigated. Disposed within well 10 is subsurface well logging instrument 12. The system diagramed in FIG. 1 is a microprocessor-based nuclear well logging system. Well logging instrument 12 includes a gamma ray detector 14. To protect the detector systems from the high temperatures encountered in boreholes, the detector system may be mounted in a Dewar-type flask. A power supply 15 provided. Cable 20 suspends instrument 12 in well 10 and contains the required conductors for electrically connecting instrument 12 with the surface apparatus.

The outputs from detector 14 is coupled to detector board 22, which amplifies these outputs and compares them to an adjustable discriminator level for passage to channel generator 26. Channel generator 26 is a component of multi-channel scale (MCS) section 24 which further includes spectrum accumulator 28 and central processor unit (CPU) 30. As will be explained later, MCS section 24 accumulates spectral data in spectrum accumulator 28 by using a channel number generated by channel generator 26 and associated with a pulse as an address for a memory location. After all of the channels have had their data accumulated, CPU 30 reads the spectrum, or collection of data from all of the channels, and sends the data to modem 32 which is coupled to cable 20 for transmission of the data over a communication link to the surface apparatus. Also to be explained later is the further function of channel generator 26 in generating synchronization signals which control the pulse frequency of source (not shown, and further functions of CPU 30 in communicating control commands which define certain operational parameters of instrument 12 including the discriminator levels of detector board 22. For the method of the present invention, only total gamma ray counts are used without regard to the spectrum of the gamma rays.

The surface apparatus includes master controller 34 coupled to cable 20 for recovery of data from instrument 12 and for transmitting command signals to instrument 12. There is also associated with the surface apparatus a depth controller 36 which provides signals to master controller 34 indicating the movement of instrument 12 within well 10. The system operator accesses the master controller 34 to allow the system operator to provide selected input for the logging operation to be performed by the system. Display unit 40 and mass storage unit 44 are also coupled to master controller 34. The primary purpose of display unit 40 is to provide visual indications of the generated logging data as well as systems operations data. Storage unit 44 is provided for storing logging data generated by the system as well as for retrieval of stored data and system operation programs. A satellite link may be provided to send data and or receive instructions from a remote location.

In a well logging operation such as is illustrated by FIG. 1, master controller 34 initially transmits system operation programs and command signals to be implemented by CPU 30, such programs and signals being related to the particular well logging operation. Instrument 12 is then caused to traverse well 10 in a conventional manner.

Figure 2:
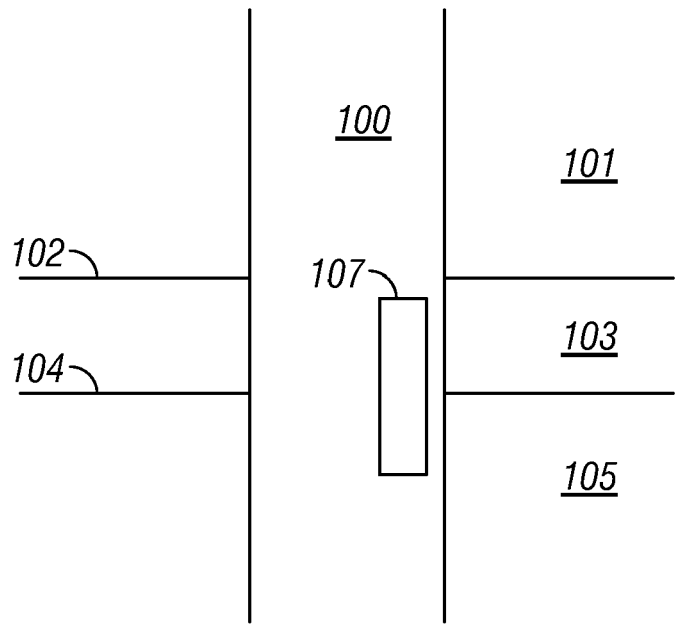
FIG. 2 shows an exemplary gamma ray logging tool in a borehole in an earth formation having a thin shale bed.

Turning now to FIG. 2, a gamma ray detector 107 is shown in a borehole 100 in an earth formation. The gamma ray detector is shown proximate to a layer 103 in the earth formation that is sandwiched between layers 101 and 105. The objective of the present invention is to be able to accurately identify the positions of the boundaries 102, 104 between the layers 101, 103 and 105 in a situation such as that shown where the detector length may be comparable or larger than the thickness of layer 103.

Figure 3:
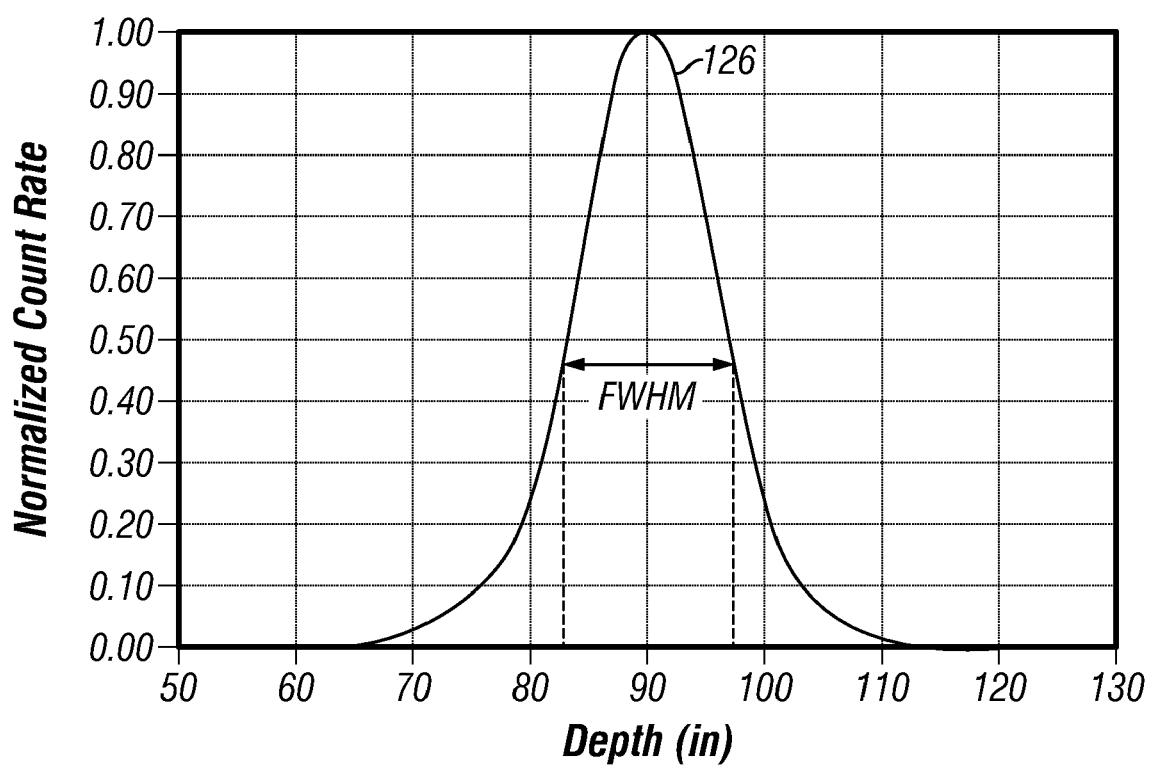
FIG. 3 shows the modeled response of the exemplary gamma ray logging tool as a function of bed thickness.

FIG. 3 shows an exemplary response 126 of a detector 107. The response of a gamma ray tool with a 2"×12" (5×30 cm) CsI detector to a 6" (15 cm) shale layer (103) calculated using Monte Carlo simulation is shown. The shale has gamma ray values of 150 API units. The plot of FIG. 3 has been normalized. Using the inflection method, the thickness of the shale would be interpreted as being 14 inches (35 cm).

In one embodiment of the present invention, a measurement of the full log width at half maximum magnitude is used. This is shown in FIG. 3 where the response curve is depicted by 126 and the log width at half maximum amplitude is depicted by 'FWHM'. FWHM is analogous to the standard deviation term in a Gaussian distribution function and thus it is a function of the distribution shape and not a function of the log API readings. This means that the FWHM of a 6 in. (15 cm) shale formation of 150API is the same with that of a 6 in.

(15 cm) 100API shale formation. The FWHM is a characteristic of the width of the tool response.

Figure 4:
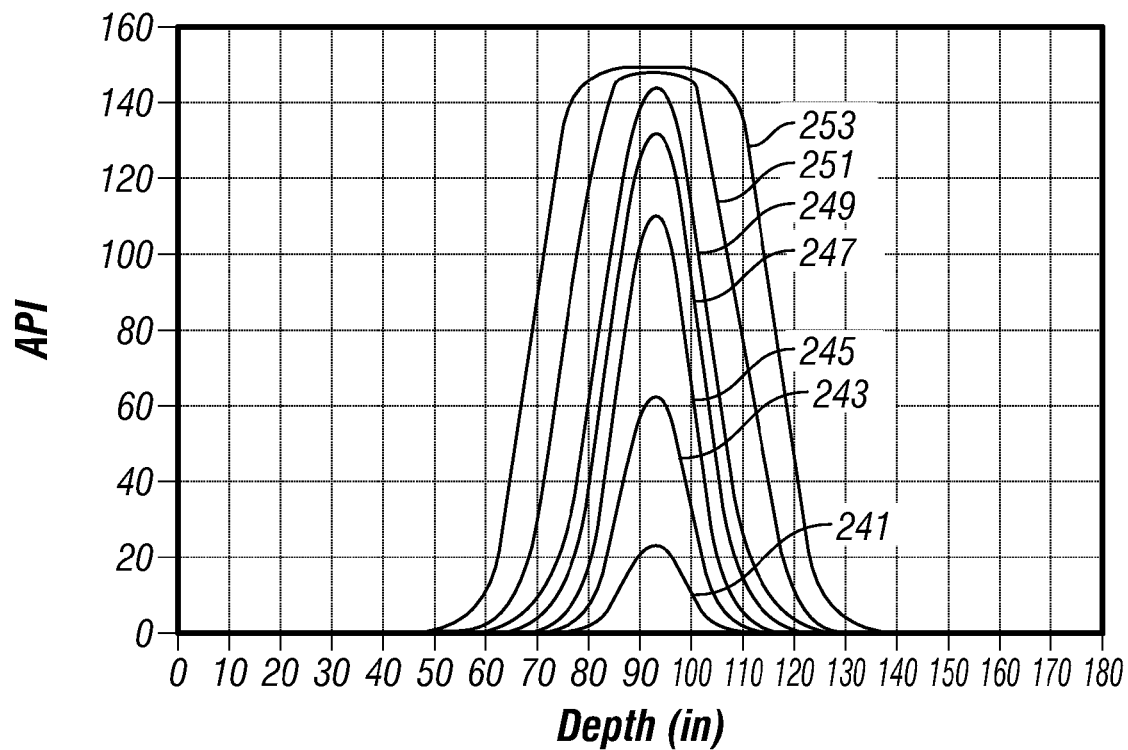
FIG. 4 shows modeled responses for layers of different thicknesses.
Figure 5:
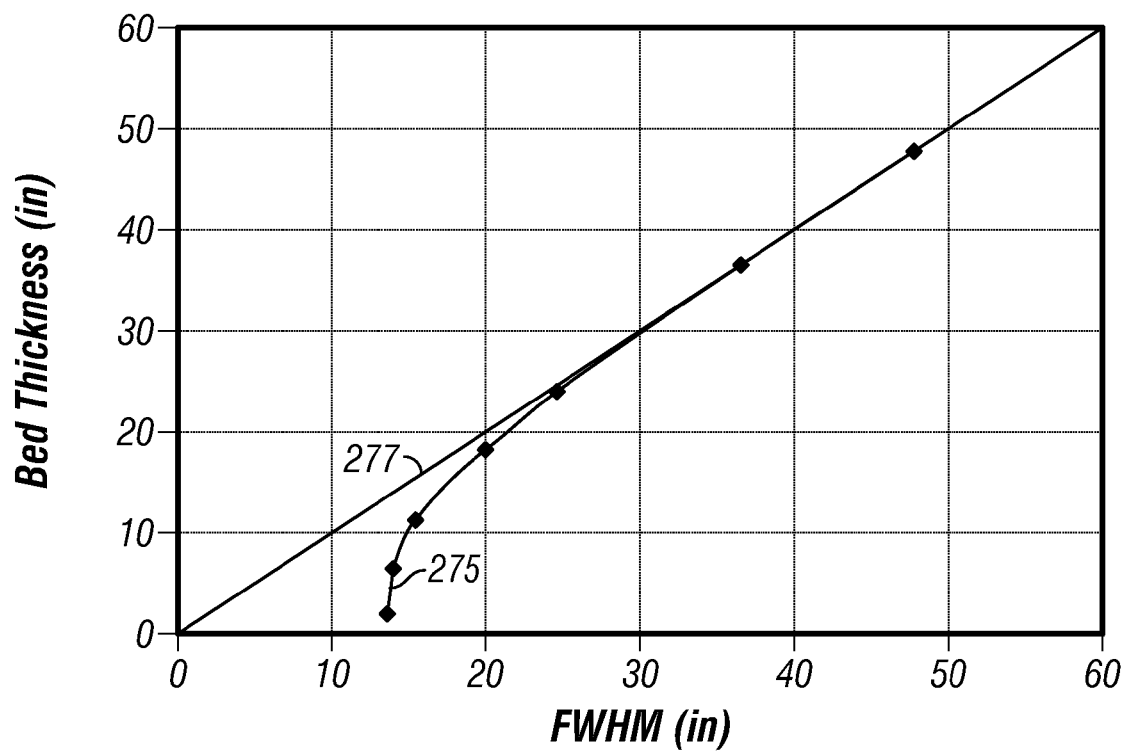
FIG. 5 shows the relationship between the width of the tool response and the bed thickness.

Shown in FIG. 4 are the tool responses of shale beds of thicknesses 2 in. (5 cm) 241, 6 in. (15 cm) 243 12 in. (30.5 cm) 245, 18 in. (46 cm) 247, 24 in. (61 cm) 249, 36 in. (91.5 cm) 251, and 48 in. (122 cm) 253. The FWHM values of these logs were calculated by fitting the logs with polynomials. In one embodiment of the invention, a fourth order polynomial was used. The use of a fourth order polynomial is for exemplary purposes only and polynomials of other orders could be used, as could other types of fitting functions like exponentials The computed FWHM values are plotted against the true bed thickness in FIG. 5. Shown therein are the true bed thickness 275 for a measured FWHM and a straight line fit 277 to 275 constrained to pass through (0,0). FIG. 5 shows that true bed boundary is well defined as a function of FWHM with vertical resolution of about 4 in. (10 cm). The use of FWHM in the present invention is thus able to resolve a 4 in. (10 cm) layer with a 12 in. (30.5 cm) gamma ray instrument.

In one embodiment of the present invention, the true bed thickness L is determined from FWHM using a function of the form:

$$L = FWHM - ae^{b(FWHM-f)} - ce^{d(FWHM-f)} \quad (1)$$

where a, b, c, d, and f are tool dependent coefficients. The coefficients may be determined by a suitable calibration either on simulated data or on field data where borehole image data is available to identify the thickness of thin shale layers.

Figure 6:
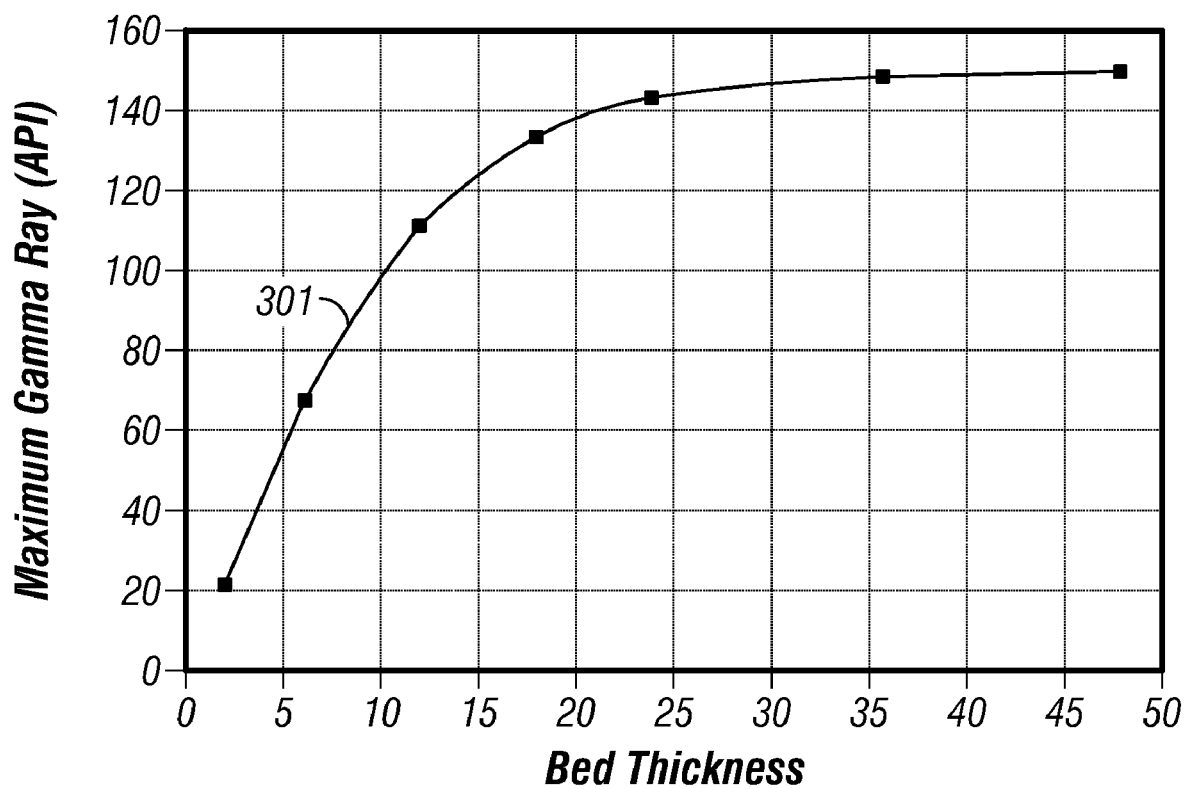
FIG. 6 shows the relationship between the measured maximum tool response and the peak response for a thin shale bed.

In the present invention, the maximum gamma ray readings and bed thickness (FIG. 4) may be used to determine the peak gamma ray values characterizing the shale layer. The relationship is shown in FIG. 6 The measured maximum gamma ray values 301 from FIG. 4 are plotted against the computed bed thickness using eqn. (1). A fitting function of the form $$GR = \frac{L}{\left(1 - e^{-hGR_{peak}}\right)} \quad (2)$$

where GR is the measured maximum of the gamma ray curve, L is the computed bed thickness, $GR_{peak}$ is the actual gamma ray value associated with the shale and h is a fitting parameter.

Figure 7:
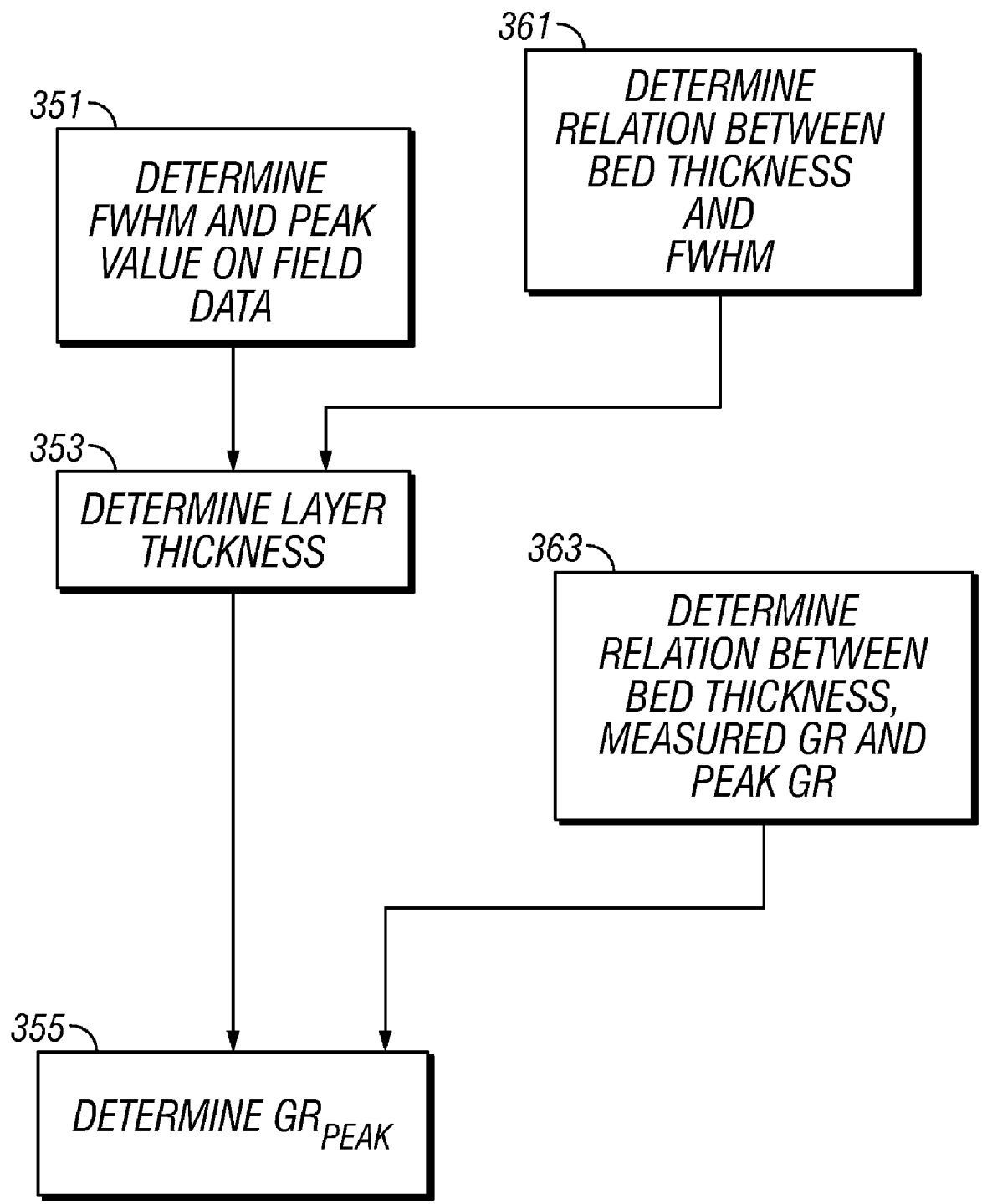
FIG. 7 is a flow chart illustrating the method of the present invention

Based on the above discussion, a flow chart of the method of the present invention is shown in FIG. 7. The FWHM and peak value are measured 351 on the log. The relationship between the FWHM and the bed thickness (according to, for example, eqn. 1) for the particular logging tool would be predetermined 361. As noted above, this relationship may be obtained by simulation such as Monte Carlo simulation or by actual measurements. Using the relationship between FWHM and bed thickness, the bed thickness is determined 353. As discussed above, the relationship between the bed thickness, the measured maximum GR response and the peak GR response is established 363 using, for example eqn. 2. Using the relationship and the bed thickness in 353, the peak GR response for the shale layer is determined 355.

The processing of the data may be carried out using a downhole processor, a surface processor or a processor at a remote location. Implicit in the processing of the data is the use of a computer program implemented on a suitable machine readable medium that enables the processor to perform the control and processing. The machine readable medium may include ROMs, EPROMs, EAROMs, Flash Memories and Optical disks.

The invention has been described in terms of measurements made using logging tools conveyed on a wireline device in a borehole. The method can also be used using data obtained by sensors conveyed on a slickline. The method can also be used on data obtained using measurement-while-drilling sensors conveyed on a drilling tubular.

While the foregoing disclosure is directed to the specific embodiments of the invention, various modifications will be apparent to those skilled in the art. It is intended that all such variations within the scope and spirit of the appended claims be embraced by the foregoing disclosure.

What is claimed is:

1. A method of evaluating an earth formation including a thin bed, the method comprising:
    obtaining measurements with a sensor on a nuclear logging tool at a plurality of depths encompassing the thin bed;
    determining a characteristic width of the measurements;
    determining a thickness of the thin bed using a predetermined relationship of the form $$L = FWHM - ae^{b(FWHM-f)} - ce^{d(FWHM-f)}$$

where a, b, c, d, and f are tool dependent coefficients determined by a suitable calibration, FWHM is the characteristic width, and L is the bed thickness; and
    recording the thickness on a suitable medium.

2. The method of claim 1 wherein the measurements comprise natural gamma ray measurements.

3. The method of claim 1 wherein a length of the sensor is greater than a thickness of the thin bed.

4. The method of claim 1 wherein determining the characteristic width further comprises curve fitting the measurements.

5. The method of claim 1 further comprising obtaining the predetermined relationship using a Monte Carlo simulation.

6. The method of claim 1 further comprising:
    (i) selecting a maximum of the measurements made at the plurality of depths, and
    (ii) determining from the maximum of the measurements made at the plurality of depths and the determined thickness of the thin bed a peak response characterizing the thin bed.

7. The method of claim 6 wherein determining the peak response characterizing the thin bed further comprises using a relation of the form:

$$GR = \frac{L}{\left(1 - e^{-hGR_{peak}}\right)}$$

wherein L is the determined thickness of the thin bed, GR is the maximum of the measurements made at the plurality of depths in the thin bed, h is a fitting parameter, and $GR_{peak}$ is the peak response characterizing the thin bed.

8. The method of claim 1 wherein the thin bed comprises a shale.

9. An apparatus for evaluating an earth formation including a thin bed, the apparatus comprising:
    a sensor on a nuclear logging tool which is configured to make measurements at a plurality of depths encompassing the thin bed; and
    a processor which is configured to determine a thickness of the thin bed using a relationship of the form $$L = FWHM - ae^{b(FWHM-f)} - ce^{d(FWHM-f)}$$

where a, b, c, d, and f are tool dependent coefficients determined by a suitable calibration, FWHM is the characteristic width, and L is the bed thickness.

10. The apparatus of claim 9 wherein the measurements comprise natural gamma ray measurements.

11. The apparatus of claim 9 wherein a length of the sensor is greater than a thickness of the thin bed.

12. The apparatus of claim 9 wherein the processor is configured to determine the characteristic width by curve fitting the measurements.

13. The apparatus of claim 9 wherein the processor is further configured to:
  (i) select a maximum of the measurements made at the plurality of depths, and
  (ii) determine from the maximum of the measurements made at the plurality of depths and the determined thickness of the thin bed a peak response characterizing the thin bed.

14. The apparatus of claim 13 wherein the processor is configured to determine the peak response using a relation of the form:

$$GR = \frac{L}{\left(1 - e^{-hGR_{peak}}\right)}$$

wherein L is the determined bed thickness, GR is the maximum of the measurements made at the plurality of depths in the thin bed, h is a fitting parameter, and $GR_{peak}$ is the peak response characterizing the thin bed.

15. The apparatus of claim 9 further comprising a conveyance device which is configured to convey the nuclear logging tool into a borehole in the earth formation, the conveyance device selected from (i) a wireline, (ii) a slickline, and, (iii) a drilling tubular.

16. The apparatus of claim 9 wherein the processor is at one of (i) a downhole location, (ii) a surface location, and, (iii) a remote location.

17. A computer readable medium having stored thereon instructions that when read by a processor, enable the processor to perform a method, the method comprising:
  determining a thickness of a thin bed in the earth formation using measurements made by the sensor at a plurality of depths including the thin bed using a relationship of the form $$L = FWHM - ae^{b(FWHM-f)} - ce^{d(FWHM-f)}$$

where a, b, c, d, and f are tool dependent coefficients determined by a suitable calibration, FWHM is a determined characteristic width, and L is the bed thickness; and
  recording the thickness on a tangible medium.

18. The computer readable medium of claim 17 further comprising at least one of (i) a ROM, (ii) an EPROM, (iii) an EAROM, (iv) a Flash Memory, and (v) an Optical disk.

19. The computer readable medium of claim 17 further comprising instructions which enable the processor to determine the characteristic width of the measurements.

\* \* \* \* \*